No. 776,401. PATENTED NOV. 29, 1904.
J. D. A. JOHNSON.
MECHANICAL MOVEMENT.
APPLICATION FILED MAY 5, 1904.
NO MODEL. 2 SHEETS—SHEET 2.
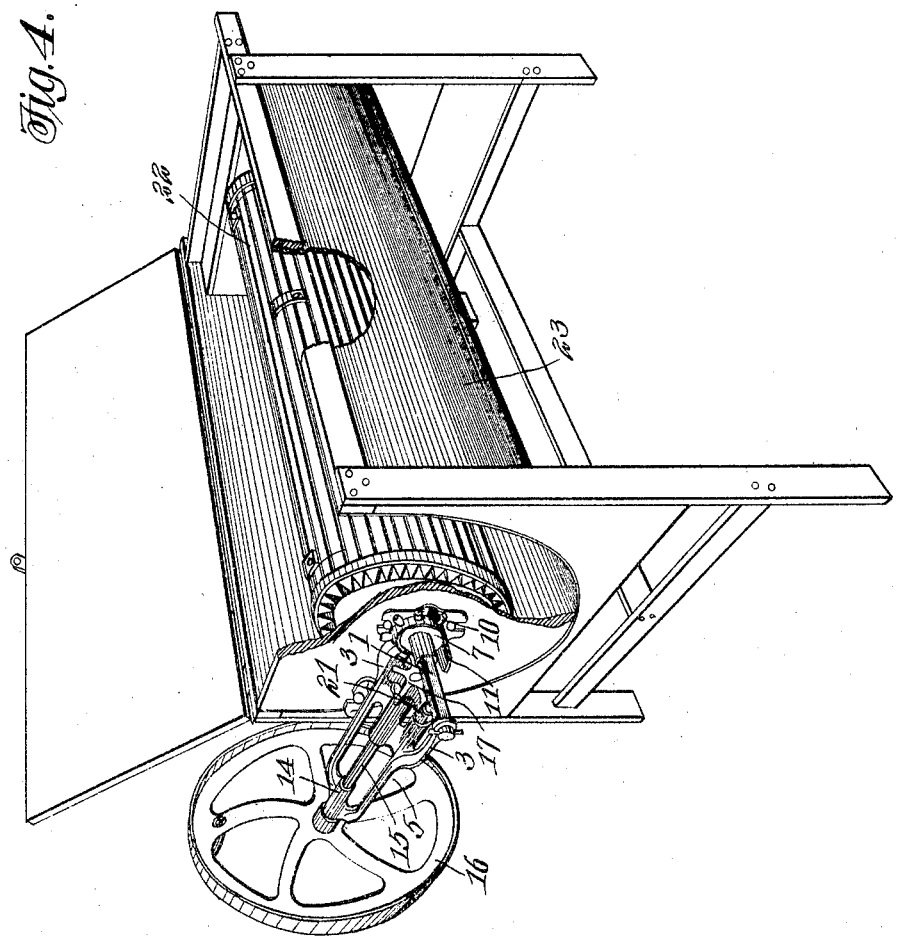
Inventor
John D. A. Johnson No. 776,401. Patented November 29, 1904.

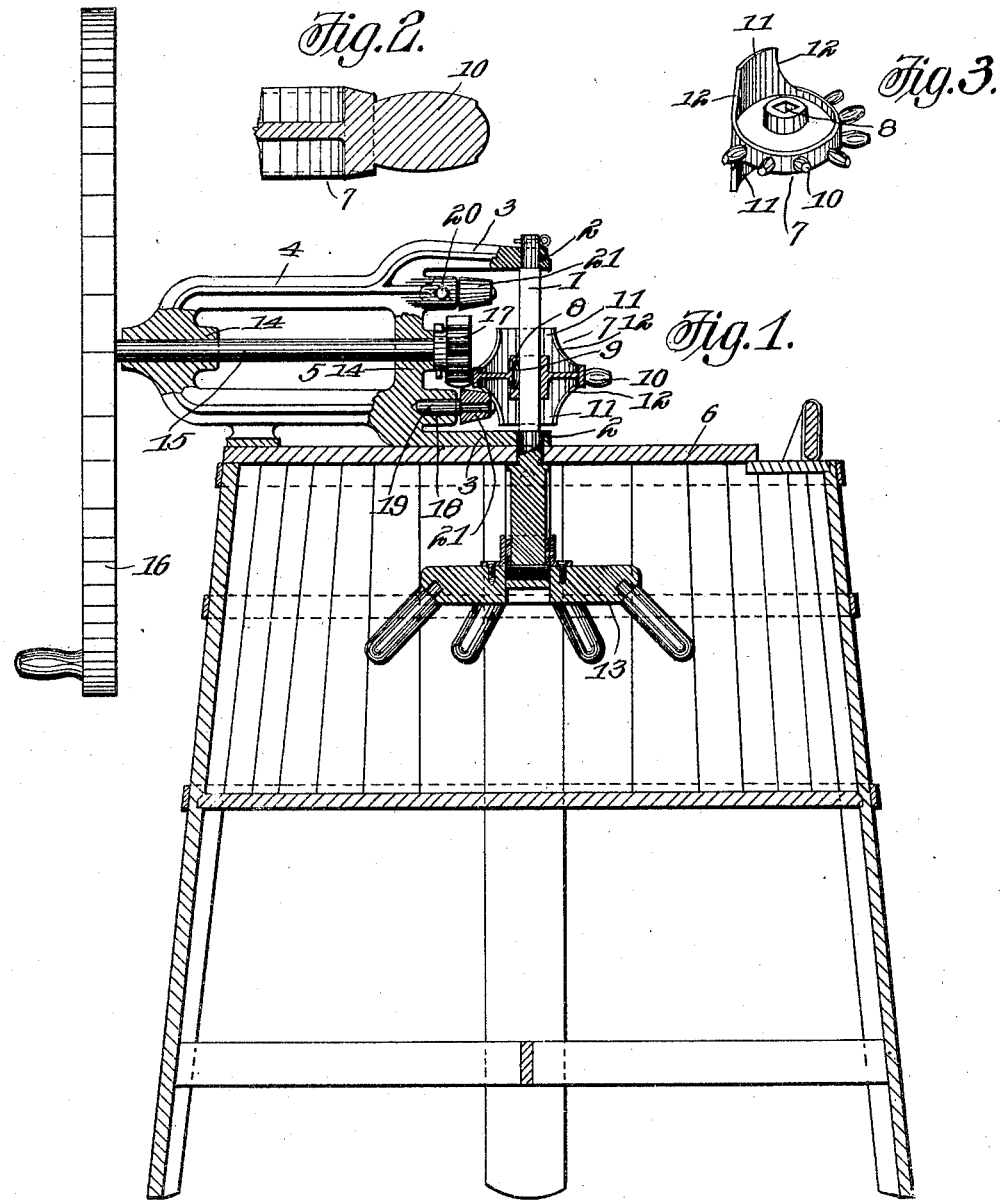

UNITED STATES PATENT OFFICE.

JOHN D. A. JOHNSON, OF OMAHA, NEBRASKA.

MECHANICAL MOVEMENT.

SPECIFICATION forming part of Letters Patent No. 776,401, dated November 29, 1904.

Application filed May 5, 1904. Serial No. 206,557. (No model.)

*To all whom it may concern:*

Be it known that I, JOHN D. A. JOHNSON, a citizen of the United States, residing at Omaha, in the county of Douglas and State of Nebraska, have invented certain new and useful Improvements in Mechanical Movements; and I do declare the following to be a full, clear, and exact description of the invention, such as will enable others skilled in the art to which it appertains to make and use the same.

My invention is an improved mechanical movement for converting rotary into oscillating motion and adapted for use in connection with washing and other machines; and it consists in the construction, combination, and arrangement of devices hereinafter described and claimed.

In the accompanying drawings, Figure 1 is a vertical sectional view of my improved mechanical movement, showing the same in use on a washing-machine for imparting oscillating motion to the stirrer. Fig. 2 is a detail sectional view of the mutilated oscillating gear. Fig. 3 is a detail perspective view of the same. Fig. 4 is a perspective view, with parts broken away, showing another form of washing-machine provided with my improved mechanical movement for operating the same.

In the embodiment of my invention shown in Fig. 1 there is a vertical shaft 1, which is mounted in bearings 2 at the ends of the upper and lower arms 3, formed at the inner end of a bearing bracket or frame 5, which is here shown as secured on the cover 6 of a washing-machine. That portion of the shaft 1 which is between the bearings 2 is angular in cross-section, and on the same is mounted a mutilated gear 7 for oscillating movement with the said shaft and also for vertical or longitudinal movement thereon independently thereof. The hub of the said oscillating mutilated gear is formed with a recess 8 in one side, in which is disposed the spring 9, which bears against and slides on the shaft and prevents the oscillating mutilated gear from rattling. The said gear is provided with peripheral spurs 10, which extend partly around the same, and that portion of the periphery of the said gear which is not provided with the said spurs is formed with oppositely-extending lugs 11, the opposite edges of which are curved or inclined reversely, so that they converge outwardly and form reversely-disposed cam faces or surfaces 12. To the lower end of the shaft 1 is secured an agitator or stirrer 13. The bracket or frame 4 is provided with bearings 14 for a shaft 15, which when in operation is revoluble continuously in one direction, and is here shown as provided at its outer end with the crank-wheel 16, whereby it may be rotated. To the inner end of the said shaft is secured a spur-pinion 17, which is adapted to engage and disengage the spurs of the oscillating reciprocating mutilated gear 7.

The bracket or frame 4 is provided at points beyond opposite sides of the pinion 17, diametrically and in line with the shaft 1, with sockets 18, in which are secured longitudinally-adjustable shafts 19 by means of set-screws 20. On the outer ends of the said longitudinally-adjustable shafts are mounted tappet-rollers 21, which are here shown as of truncated conical form. These tappet-rollers coact with the cams 12 of the mutilated gear to move the latter longitudinally on the shaft 1 and to alternately engage the spurs of the mutilated gear with opposite sides of the continuously-revoluble pinion 17, so that the said mutilated gear is turned partly in one direction and then in the reverse direction and imparts oscillating motion to the shaft and to the agitator, which is secured thereto. The longitudinally-adjustable shafts 19, which carry the tappet-rollers, enable the latter to be adjusted to compensate for wear thereof and of the cams 12.

In Fig. 4 of the drawings I show my improved mechanical movement at one end of another form of a washing-machine, the latter being provided with a cylinder 22, mounted in a longitudinal tub or body 23, the said cylinder being oscillated by the operation of my improved mechanical movement, as heretofore stated.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a mechanical movement for converting rotary into oscillating motion, the combination of a longitudinally movable and oscillating mutilated gear having radial peripheral studs extending partly around the same and oppositely-extending lugs at that part of its perimeter which is not provided with studs, said lugs having reversely-disposed outwardly-converging cam-faces; a revoluble spur-pinion having a fixed bearing, arranged at right angles to the mutilated gear and adapted to be engaged and disengaged on opposite sides by the spurs thereof, and relatively fixed tappets disposed diametrically on opposite sides of the pinion and alternately engaged by the reversely-disposed cams of the mutilated gear to impart reciprocating longitudinal motion thereto.

2. In a mechanical movement for converting rotary into oscillating motion, the combination of a shaft mounted for oscillating movement, a mutilated gear mounted thereon for oscillation therewith and independent longitudinal movement thereon, said mutilated gear having radial peripheral studs extending partly around the same and oppositely-extending lugs at that part of its periphery which is not provided with studs, said lugs having reversely-disposed outwardly-converging cam-faces; a revoluble shaft, a pinion thereon rotated thereby, arranged at right angles to the mutilated gear and adapted to be alternately engaged by the studs thereof on opposite sides, and relatively fixed tappet-rollers disposed diametrically on opposite sides of the pinion and alternately engaged by the revesely-disposed cams of the mutilated gear to impart reciprocating longitudinal motion thereto.

3. In a mechanical movement for converting rotary into oscillating motion, the combination of a longitudinally movable and oscillating mutilated gear having radial peripheral spurs extending partly around the same, and oppositely-extending lugs at that part of its perimeter which is not provided with spurs, said lugs being reversely disposed, outwardly-converging cam-faces, an oscillating shaft on which the said gear is mounted for rotation therewith and longitudinal movement thereon, a spring bearing between said gear and said shaft to prevent the gear from rattling, and a revoluble spur-pinion having a fixed bearing arranged at right angles to the mutilated gear and adapted to engage and disengage the spurs thereof, and relatively fixed tappets disposed diametrically on opposite sides of the pinion and alternately engaged by the reversely-disposed cams of the mutilated gear to impart reciprocating longitudinal motion thereto.

In testimony whereof I have hereunto set my hand in presence of two subscribing witnesses.

JOHN D. A. JOHNSON.

Witnesses:
L. H. BRADLEY,
W. O. JOHNSON.